Patented July 18, 1950

2,515,306

UNITED STATES PATENT OFFICE 2,515,306

PROCESS FOR PRODUCING ESTERS OF OMEGA, OMEGA, OMEGA-TRIHALO ALIPHATIC CARBOXYLIC ACIDS

Elbert C. Ladd, Passaic, and Herbert Sargent, Glen Rock, N. J., assignors to United States Rubber Company, New York, N. Y., a corporation of New Jersey No Drawing. Application April 26, 1949, Serial No. 89,812

9 Claims. (Cl. 260—487)

This invention relates to a novel method of synthesizing esters of $\omega,\omega,\omega$-trihalogenoalkanoic acids. More particularly, the invention relates to the selective catalytic hydrogenation of 2,4,4,4-tetrahalogenobutyric esters whereby the halogen atom in the 2- position is selectively replaced with hydrogen.

It is known that esters of 2,4,4,4-tetrahalogenobutyric acids will react with hydrogen in the presence of a base to yield coupled products, e. g.:

(1) 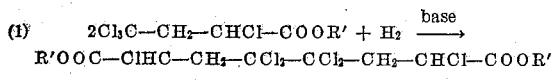

where R' is an alkyl group.

We have now discovered that if the hydrogenation of esters of 2,$\omega,\omega,\omega$-tetrahalogenoalkanoic acid is carried out in neutral or acidic media, i. e., while maintaining the reaction mixture at a pH of not over 7, the coupling reaction heretofore encountered does not occur. Instead, the 2-halogen atom, i. e., the halogen on the carbon atom adjacent to the carboxyl group, is selectively removed without affecting the halogen atoms of the trihalogenomethyl group, thus:

(2) 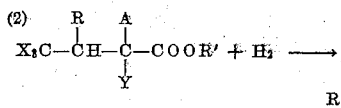

In the formulae given in Equation 2, all three X's are either chlorine or bromine, Y is either chlorine or bromine, R is either hydrogen or alkyl, A is hydrogen, alkyl, or carbalkoxy, provided that one of R and A is hydrogen, and R' is alkyl.

The same reaction as is portrayed by Equation 2 also occurs with such esters in which the

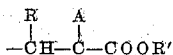

group is repeated, i. e., with esters of the type

in which n is an integer from 1 to 9; and with esters of the type $X_3C—(CH_2)_n—CHY—COOR'$. All of the esters here formulated are esters of 2,$\omega,\omega,\omega$-tetrahalogenoalkanoic acids, and in all of them the 2-halogen atom is preferentially replaced by hydrogen in our reaction.

Hence, by our method, a new group of compounds can now be prepared which are particularly useful in numerous syntheses involving reactions such as hydrolysis, hydrogenative coupling, dehydrohalogenation, and metathetical replacement. Such materials are useful in the preparation of pharmaceuticals, plasticizers and lube-oil additives.

Illustrative of the compounds obtainable by our method are methyl 4,4,4-trichlorobutyrate, ethyl 4,4,4-tribromobutyrate, methyl 4,4,4-trichloro-3-methylbutyrate and ethyl 4,4,4-trichlorobutyrate. The R' may be any alkyl group but is usually a lower alkyl group. When R is an alkyl group, it may be any alkyl group, but likewise is usually a lower alkyl group. When A is an alkyl group it usually is lower alkyl and when A is carbalkoxy the alkyl group contained therein is usually lower alkyl.

The reaction of our invention is carried out by agitating the ester of the 2,$\omega,\omega,\omega$-tetrahalogenoalkanoic acid with gaseous hydrogen in the presence of a catalytic amount, e. g., 0.1 to 1.0 gram per mole (gram molecular weight) of the ester, of a hydrogenation catalyst. Any hydrogenation catalyst may be used. We generally employ Raney nickel, platinum, palladium, or a salt or oxide of platinum or palladium, e. g., platinum oxide. In accordance with conventional practice, the catalyst is preferably employed in highly extended form such as is presented by Raney nickel, or as is achieved by the impregnation of a suitable adsorptive support with a solution of a compound of the metal used as catalyst followed by conversion to catalytic form as by drying, heating, reducing, etc.

The reaction of our invention is carried out under neutral or acidic conditions, i. e., while maintaining the reaction mixture at a pH of 7 or lower.

In our reaction, the absorption of the theoretical quantity of hydrogen, namely 1 mole per mole of ester reactant, proceeds smoothly and rapidly, usually within 24 hours, and at room or ambient temperature, i. e., from 20 to 30° C. and usually ca. 25° C., and at atmospheric pressure. Hence the use of elevated temperatures and of superatmospheric pressures is usually unnecessary. Inert diluents, which are preferably solvents for the ester reactant and ester product, e. g., organic liquids such as methanol, ethanol and cyclohexanone, may be employed if desired. If the ester is normally solid, use of such inert diluents to maintain it in liquid phase is highly desirable.

Usually the hydrogen is introduced gradually to the reaction mixture. We generally supply hydrogen at a rate substantially equal to that at which it is being consumed in the reaction. The provision of means for achieving this result will be well within the skill of workers in the art.

After the reaction has achieved the desired degree of completion, usually after substantially one mole of hydrogen has reacted per mole of ester reactant, the reaction mixture is treated in any suitable manner to recover the product ester. The reaction product can be isolated and purified by any suitable means such as preferential extraction, fractional distillation or crystallization.

The following examples disclose our invention in more detail.

*Example 1*

This illustrates the hydrogenation of methyl 2-bromo-4,4,4-trichlorobutyrate which can be obtained by the peroxide-catalyzed reaction of bromotrichloromethane with methyl acrylate.

A solution of 58 g. (0.204 mole) of methyl 2-bromo-4,4,4-trichlorobutyrate in 50 ml. of absolute ethanol is admixed with a suspension of 0.3 g. of pre-reduced platinum oxide in 10 ml. of ethanol, prepared by the conventional procedure of Adams et al. ("Organic Syntheses," Coll. vol. I by Gilman and Blatt). The mixture is enclosed in a glass vessel connected to a supply of hydrogen at ca. 25° C. and atmospheric pressure. The reaction mixture is then shaken vigorously for about 100 minutes during which time about 5300 ml. (0.216 mole) of hydrogen are absorbed, and thereafter absorption virtually ceases. The reaction mixture is then diluted with about 3 volumes of water and extracted with several portions of n-hexane. The extracts are combined, dried and fractionally distilled to yield 34.5 grams of the liquid methyl 4,4,4-trichlorobutyrate, b. 78–80° C./8 mm.; per cent chlorine=50.88% (theory=51.80%); $n_D^{20}$ 1.374.

*Example 2*

This illustrates the hydrogenation of methyl 2-bromo-4,4,4-trichloro-3-methylbutyrate, derived from the peroxide-catalyzed reaction of bromotrichloromethane with methyl crotonate.

In the manner of Example 1, 29 grams (0.0974 mole) of methyl 2-bromo-4,4,4-trichloro-3-methylbutyrate are dissolved in 50 ml. of absolute ethanol, admixed with a pre-reduced suspension of 0.3 g. of platinum oxide in 10 ml. of ethanol, and hydrogenated at room temperature and atmospheric pressure. The reaction requires about 25 minutes during which time approximately 2500 ml. (0.102 mole) of hydrogen are absorbed. From the reaction mixture are isolated 19 g. of the new compound methyl 4,4,4-trichloro-3-methylbutyrate, b. 80–5° C./7.5 mm.; per cent chlorine=47.54 (theory=49.5%).

(a) Four grams of the trichloro ester of Example 2 are heated with 10 ml. of concentrated sulfuric acid at 120° C. until the evolution of hydrogen chloride ceases, which requires about 5 minutes. The mixture is then poured onto ice and extracted 3 times with n-hexane. The extracts are combined, dried and evaporated, leaving a crystalline residue. The latter, upon recrystallization from isopropyl ether, proves to be the known i-methylsuccinic acid, M. P. 111–111.2° C. (lit. 111–112° C.).

The esters used as starting materials in the practice of our invention may be prepared in any suitable manner. Many of them are prepared by the peroxide-catalyzed reaction of a tetrahalogenomethane with an ester of acrylic acid or of a 2-alkyl or 3-alkyl acrylic acid or of methylenemalonic acid. The esters most commonly employed are made by the reaction of bromotrichloromethane with the lower alkyl esters of acrylic acid, methacrylic acid, crotonic acid, methylenemalonic acid, etc.

Having thus described our invention, what we claim and desire to protect by Letters Patent is:

1. The method which comprises reacting an ester of a 2,ω,ω,ω-tetrahalogenoalkanoic acid with hydrogen in the presence of a hydrogenation catalyst while maintaining non-basic reaction conditions and thereby effecting selective replacement of the 2-halogen atom with hydrogen.

2. The method of claim 1 wherein said reaction is carried out at ambient temperature and atmospheric pressure.

3. The method of claim 1 wherein said reaction is carried out by agitating a mixture of said ester in liquid phase and said hydrogenation catalyst with gaseous hydrogen at atmospheric pressure until substantially one mole of hydrogen has been absorbed per mole of said ester.

4. The method which comprises reacting methyl 2-bromo-4,4,4-trichlorobutyrate with hydrogen in the presence of a hydrogenation catalyst while maintaining the reaction mixture at a pH of not over 7 and thereby effecting selective replacement of the bromine atom with hydrogen, and recovering methyl 4,4,4-trichlorobutyrate from the resulting reaction mixture.

5. The method of claim 4 wherein said reaction is carried out at ambient temperature and at atmospheric pressure.

6. The method of claim 4 wherein said reaction is carried out by agitating a mixture of said ester in liquid phase and said hydrogenation catalyst with gaseous hydrogen at atmospheric pressure until substantially one mole of hydrogen has been absorbed per mole of said ester.

7. The method which comprises reacting methyl 2-bromo-4,4,4-trichloro-3-methylbutyrate with hydrogen in the presence of a hydrogenation catalyst while maintaining the reaction mixture at a pH of not over 7 and thereby effecting selective replacement of the bromine atom with hydrogen, and recovering methyl 4,4,4-trichloro-3-methylbutyrate from the resulting reaction mixture.

8. The method of claim 7 wherein said reaction is carried out at ambient temperature and at atmospheric pressure.

9. The method of claim 7 wherein said reaction is carried out by agitating a mixture of said ester in liquid phase and said hydrogenation catalyst with gaseous hydrogen at atmospheric pressure until substantially one mole of hydrogen has been absorbed per mole of said ester.

ELBERT C. LADD.
HERBERT SARGENT.

No references cited.